(12) United States Patent
Walker

(10) Patent No.: US 9,328,717 B1
(45) Date of Patent: May 3, 2016

(54) GOLDEN RATIO AXIAL FLOW APPARATUS

(76) Inventor: James A. Walker, Fort Myers, FL (US)

( * ) Notice: Subject to any disclaimer, the term of this patent is extended or adjusted under 35 U.S.C. 154(b) by 985 days.

(21) Appl. No.: 12/799,141

(22) Filed: Apr. 19, 2010

Related U.S. Application Data

(60) Provisional application No. 61/214,607, filed on Apr. 27, 2009.

(51) Int. Cl.
*F03D 3/02* (2006.01)
*F03D 3/00* (2006.01)
*F03D 3/06* (2006.01)

(52) U.S. Cl.
CPC .......... *F03D 3/005* (2013.01); *F03D 3/061* (2013.01); *F05B 2200/23* (2013.01); *F05B 2250/14* (2013.01); *F05B 2250/15* (2013.01); *F05B 2250/712* (2013.01)

(58) Field of Classification Search
CPC ....................................................... F03D 3/061
USPC ............ 415/4.2, 4.4, 76, 71, 907; 416/197 A, 416/197 R
See application file for complete search history.

(56) References Cited

U.S. PATENT DOCUMENTS

| | | | |
|---|---|---|---|
| 1,696,754 A | 10/1929 | Savonius | |
| 1,835,018 A | 12/1931 | Darrieus | |
| 5,252,029 A * | 10/1993 | Barnes | 416/142 |
| 5,451,137 A | 9/1995 | Gorlov | |
| 5,852,331 A | 12/1998 | Giorgini | |
| 5,934,877 A * | 8/1999 | Harman | 416/223 R |
| 6,465,899 B2 | 10/2002 | Roberts | |
| 6,688,842 B2 | 2/2004 | Boatner | |
| 6,702,552 B1 * | 3/2004 | Harman | 416/223 R |
| 7,040,859 B2 | 5/2006 | Kane | |
| 7,303,369 B2 | 12/2007 | Rowan et al. | |
| 7,494,315 B2 | 2/2009 | Hart | |
| 7,573,148 B2 | 8/2009 | Nica | |
| 8,317,480 B2 * | 11/2012 | Scarpelli | 416/197 A |
| 2004/0086373 A1 * | 5/2004 | Page, Jr. | 415/4.2 |
| 2006/0257240 A1 * | 11/2006 | Naskali et al. | 415/4.4 |
| 2007/0025846 A1 * | 2/2007 | Harman | 415/206 |
| 2007/0258806 A1 * | 11/2007 | Hart | 415/71 |
| 2008/0085179 A1 * | 4/2008 | Kinkaid et al. | 415/4.1 |

(Continued)

OTHER PUBLICATIONS

Colgate's Basic Sailing, Steve Colgate, p. 28-29 and 45-61, (co 1999) ISBN 0-914747-0209 USA.

(Continued)

*Primary Examiner* — Craig Kim
*Assistant Examiner* — Kayla McCaffrey
(74) *Attorney, Agent, or Firm* — William E. Noonan

(57) ABSTRACT

A fluid flow rotary driven apparatus includes a support having an axis of rotation and a plurality of elongate, curved rotor wings attached to and extending outwardly from the support. Each wing is attached to the support at an inner end and projects outwardly in a direction transverse to the axis of rotation to a distal end. Each wing includes a convex surface defining a plurality of logarithmic spiral line segments interconnecting the inner and outer ends. Each spiral line segment extends completely within a respective plane transverse to the axis of rotation. The wings are responsive to a fluid flow across the outer surface of the wings for driving the support to turn about the axis of rotation. A rotary transmission device is operably connected to the support and responds to turning of the support for producing an energy output.

20 Claims, 6 Drawing Sheets

(56) References Cited

U.S. PATENT DOCUMENTS

2008/0267777 A1* 10/2008 Lux .......................... 416/132 B
2009/0169388 A1* 7/2009 Klimov et al. .............. 416/20 R

OTHER PUBLICATIONS

Pleasures in Mathematics, Robert & Ellen Kaplan, p. 219-220, (co 2003) ISBN 0-19-514743-3.
Physics made Simple, Ira Maximillion Freeman, p. 18,22-36,42-43(co 1990) ISBN-0-385-24228-X NY, USA.
AP Physics B 2005 edition, Kaplan, p. 87-96, Newtonian Physics (co 2005) ISBN-0-7432-6058-9.
Divine Proportion,Priya Hemenway, p. 3-9,14-15,46-48,81-85 & 126-135, (co 2005), ISBN-13: 978-1-4027-3522-6.
Renewable Energy, Godfrey Boyle, Ch. 5 Hydro Electricity, Janet Ramage, Ch. 7 Wind Energy, Derek Taylor, ISBN 0-19-856452-X Open University, UK.
Internet Resoures: (www.wikipedia.org/wiki/golden spiral), (www.jwilson.coe.uga.edu/emt699/student.folders/frietag.mark/homepage/goldenratio),(www.wikipedia.org/wiki/logarithmic spiral),(www.goldenmuseum.com)Fibonaccization of science, (www.wikipedia.org/wiki/golden ratio), (www.curvebank.calstate.edu//descartes),(www.stiltman.com)Vertical Axis Involute Wind Turbine.

* cited by examiner

GOLDEN RATIO AXIAL FLOW APPARATUS

CROSS-REFERENCE TO RELATED APPLICATIONS

This application claims the benefit of U.S. Provisional Patent Application No. 61/214,607, Apr. 27, 2009.

FEDERAL SPONSORED RESEARCH OR DEVELOPMENT

Not Applicable

SEQUENCE LISTING OR PROGRAM

Not Applicable

BACKGROUND OF THE INVENTION (A) Technical Field

The present invention relates generally to axial flow devices and more particularly, to a bio-mechanical apparatus comprised substantially of golden ratio geometry and proportions which is capable of functioning as a turbine or a pump in gas or liquid flow currents and more specifically, relates to vertical axis wind turbines.

(b) General Background

Air has mass; when it moves it has force which can be felt, heard and seen, it is the wind. Wind is not a constant force, there are gusts and lulls as well as shifts in direction. Certain archaeologists suggest that wind power was used by the ancients in China and Persia. One of the first Persian windmills was a vertical axis wind turbine (VAWT); and was made of papyrus reeds that were formed into flat sail shapes. This was what is referred to as a "drag" type of wind turbine. The wind pushed the reed sails or "blades" around a central vertical axis pivot point. It was similar to a horizontal axis water paddle wheel turned over on its side. It is called a "panemone" design and can harvest wind flow on only a portion of the windward area it occupies. This concept is used in the three cup anemometers that measure wind speed today. When the velocities of the cups are equal to the wind speed the device has a Tip Speed Ratio (TSR) of 1. This is one of the least efficient designs, though it remains one of the most commonly re-invented wind turbine concepts (commonly referred to as a Savonius VAWT). The Persian VAWT encountered a problem with the windward (or upwind) portion of the rotation cycle, because the rotating sails must travel against the wind. The Persians then built a wall to block the up wind portion of the sails and diverted the wind on to the downwind cycle of the turbine. This was one of the first of many innovative forced deflection techniques that have been used to divert and channel the wind on to a VAWT. Early horizontal axis wind turbines (HAWT) were also invented and became commonly known as "windmills". Among these were the 4 bladed Dutch and the common multiple bladed farm house type. These windmills where useful in performing tasks such as pumping water or grinding grain and later in producing electricity. Today, wind turbines generally fit into one of two categories; "lift" or "drag" or utilize both forces. In the "drag" devices, the blades are pushed by the wind force (Savonius), while in the "lift" devices the blades are pulled by creating a differential of pressure on their curved surface areas (Darrieus). A VAWT rotates around a vertical axis and is relatively omni-directional. A HAWT rotates around a horizontal axis and must be "pointed" into the wind at all times, and the blades must overcome gravity, generator bearing friction and gear box resistance before the rotation cycle can begin.

(c) Horizontal Axis Wind Turbine (HAWT) Background

The horizontal axis wind turbine HAWT has been used in various forms to perform work or generate electrical energy for many years and has evolved into the 2 and 3 "propeller blade" lift types common today. Certain HAWTs are small scale for house top and sailboat usage while others are very large, and used for utility power generation.

Large HAWT designs are mounted on high towers and must be placed in special areas in order to collect "smooth air flow pressure". The DOE has shown a recent interest in wind power due to long overdue political pressure to invest in renewable energy techniques and consequently these giant HAWTs have received much of that attention. Some of these turbines are mounted on towers as high as 300 feet and have blades of 100 feet in length. In many cases, permits must be obtained in order to be able to place these towers in the most desirable location. The site must be selected so as to enable the collection of wind flow without any clearance issues or other obstructions. These devices make a loud noise as their blade tips spin through the air at 250 mph or greater (similar to a helicopter rotor blades "whopping" sound). Additional large HAWTs have now been ordered for production around the world. Certain HAWT devices are so large as to make construction, transportation, erection and maintenance a major project. Some of the rotor blades weigh in at more than 10 tons and must be constructed to very close specifications and weights in order to maintain a proper relative balance. Also, the load impact on the horizontal bearing of the large HAWT can be enormous which can often result in maintenance and longevity issues.

Large HAWT designs have certain basic factors in common. The device must be positioned upwind (pointed into the wind). Lift forces on the propeller blades cause the rotation. Some form of brakes and a controller are required. The minimum amount of wind to start the rotation is between 8 and 16 mph. Most can not operate safely above 55 mph or serious damage can occur. These units employ a gear box converter. The main shaft rotor typically rotates at speeds between 30 and 60 rpm; this is then converted into 1000 to 1800 rpm. The generator then produces an A/C voltage on the hi-speed shaft as the output.

Additionally, the wind collection area is so large as to enable simultaneous variable forces to exist that act upon each part of the perspective blades individually and collectively causing unwanted torsional vibrations to occur. This has led to new blade designs in an attempt to control the vortices and perturbations on the rotor blades. New modifications include; devices to detect blade status with transponders using radio signals, magnetic dampening of blade tip vibration schemes, rotor pitch controllers as well as other methods of idling and feathering have been employed. These HAWTs can not re-orient themselves to instant gusts and shifts of wind direction. The device loses its efficiency as it undergoes the enormous stress and flexing forces at work on the blades, this results in distortions and fatigue that invite mechanical failure. The costs of these large HAWTs are enormous and they represent quite an investment for any company or nation. Line loss is also an issue in most installations as towers must be placed away from end use locations.

(d) Vertical Axis Wind Turbine VAWT Background

The problem which the Persian VAWT encountered is still a factor in certain modern VAWT designs. Most VAWT devices share the ability to gather wind force from any azimuth angle, and all VAWT devices share the burden of having to rotate against the wind for a portion of the rotation cycle.

This has resulted in a variety of designs and modifications in an attempt to minimize the resistance incurred or to utilize that force during the windward phase of the rotation cycle in order to increase turbine efficiency. Consequently, many improvements have been made to the overall performance of the VAWT in general. New blade designs and stator air channeling devises as well as pivotal blades are among some of these new improvements. One such device, (U.S. Pat. No. 6,688,842 B2, Feb. 10, 2004, Boatner) discloses an example of a pivotal blade turbine mechanism which mechanically adjusts or pivots the blade angles individually, but this device is unable to produce a driving force on a blade in each phase of the rotation cycle.

Additionally, VAWT blade shapes have evolved into a variety of forms. Certain shapes are in the form of the sail of a boat as is incorporated herein by reference (U.S. Pat. No. 7,303, 369 B2, Dec. 4, 2007, Rowan and Priest-Brown). This design offers the advantage of creating some lift on the windward phase of the cycle and utilizing the drag force on the downwind cycle. A common problem with certain fixed sail shapes is that they do not trim or adjust themselves with respect to the aspect angle change of the wind's impact upon them. Consequently, there is a portion of the rotation cycle when each of the sails will be at least partially back hauled (or back winded) and will not produce a driving force. At that moment, the turbine will be propelled by the inertia of the apparatus and by the other contributions from the remaining sails in the sequence. Another drawback to certain sail shape designs is that the sails originate near the central axis area in vertical column shapes and are not able to provide a means for the expended air to be sufficiently evacuated, thereby causing a loss in the performance characteristics of the turbine.

Other VAWT designs such as the 2 blade Darrieus type (eggbeater) invented in France (1927), (U.S. Pat. No. 1,835, 018 Dec. 8, 1931) have been in use for many years and is referred to here as a "lift" based turbine. The concept experienced some unwanted side effects with harmonic frequencies and difficulties in initiating rotation at low wind speeds. Sandia National Labs has made a great deal of progress with new blade designs and has improved the latter models, however, the concept in general is not new and has lost support and popularity. Also, these VAWTs tend to be very tall devices which must be supported by a large vertical mast and guy wires in order to be kept in an erected position. The unwanted downward thrust and torque loading on the main bearing is tremendous.

Certain other variations of the Darrieus VAWT utilize narrow vertical blades that are mounted at the edge of horizontal struts which emanate from the central vertical axis of rotation. Each of the blades must experience a moment of being broadside (that aspect of being perpendicular) to the oncoming wind and suffer the instantaneous "impulse" force of gusts or shifts in the wind direction acting on the blades. This "impulse" force often tends to produce a shudder or vibration in such devices. This shuddering produces unwanted instabilities and distortion of the blade alignment which alters the momentum of the turbine in a degenerative manner. Early models such as the "Giromill" and "Cycloturbine" experienced undesirable pulsatory torque, flexing and bending moments. Later designs improved the torque problem by using helical twists on the blades. However, in high winds the wing tip velocities and centrifugal forces acting upon the narrow vertical blades tends to distort the individual alignment and calibration of the blades. Therefore, the perspective skew, orthogonality, pitch, and droop are altered individually and this creates a variance of the pathways through the air for each blade. This effect makes each blade imperfect in its own peculiar fashion; each blade then creating its own non-synchronous eddies and unique burbles relative to each other. This distortion causes unpredictable turbulence for the successive blades in the rotation sequence, resulting in an overall decrease in the efficiency as well as increasing the noise of the turbine. Certain designs attach the top and bottom blade tips into a circular band in an attempt to minimize the distortion of the individual blade alignment. Still other designs employ two or more sets of horizontal strut assemblies in order to maintain the blades in proper alignment. While these modifications improve the anomalous distortion of the blade alignments described previously, they also require additional parts and added weight. These parts also damage the wind flow through the device, which is the basis for its cross wind lift concept. One such example is referred herein and is disclosed in (U.S. Pat. No. 5,451,137 Sep. 19, 1995, Gorlov). While the Gorlov VAWT has reduced the pulsatory torque problem of prior Giromills, and has made start up easier, it must attain high speeds to provide any significant amount of power output which requires a rather windy location. This design still depends on cross wind lift, which is disturbed on the leeward side of the cycle by irregular flow currents due to Von Karman street vortices created by the windward passage of the diagonal helical blades. This turbulence varies as a function of the rotation speed of the blades as well as the wind velocity producing a variety of harmonic instabilities at certain rotor and wind speed combinations that are chaotic and periodically unpredictable.

The Savonius VAWT is a "drag" based device generally having a TSR of one and is disclosed herein (U.S. Pat. No. 1,697,574, Jan. 1, 1929, Savonius). The device can be described as halving two opposing cylinder halves attached lengthwise and vertically on to a vertically rotating shaft with the interior and exterior sides connected to the shaft so as to produce an "S" shape. Consequently, one cylinder half aperture is open and exposed to the wind as the other half is closed and they then alternate as the device rotates. This concept will only produce a limited amount of power through a full cycle of rotation. Many derivatives of this concept have evolved including a certain design using a helical shaped blade that induces a vortex effect, which is incorporated herein by reference (U.S. Pat. No. 7,494,315 Feb. 24, 2009, Hart). However, the device tends to be substantially vertical, and the height to width ratio could become somewhat excessive which may also lend itself to increased torque loading impact on the vertical shaft bearing (in larger models). In addition, the device's ability to develop substantial torque through the inertial forces available on a rotating platform are hampered by the small radius of the base itself, and in certain models may require a flywheel type of contraption for added stability.

Certain other VAWT designs utilize a booster or stator channeling device in order to divert air flow on to the "drag" or downwind portion of the rotor blades. These stator boosters or external channeling devices effectively block or redirect the wind from encountering the rotor blades on the windward or upwind cycle while diverting the wind primarily on to the downwind cycle. While this does increase the performance of the rotor, it is also at the cost of eliminating or reducing most of the "lift" characteristics of the device. Consequently, these deflector stator devices create the presence of blind spots or screening angles that can distort the air flow over the rotor blades which then reduces the possible efficiency of the device in any specific wind field collection area. Incorporated herein as reference are prior art devices of this type (U.S. Pat. No. 6,465,899 B2, Oct. 15, 2002 Roberts), (U.S. Pat. No. 5,852,331 Dec. 22, 1998 Giorgini), (U.S. Pat. No. 7,573,148 B2 Aug. 11, 2009 Nica).

(E) Golden Ratio Vertical Axis Wind Turbine (GRVAWT) Background

Developing a new apparatus often requires re-examination of basic truths in order to consider a concept without preclusion, preconception and prejudice to prior art. Traditionally, science has been used to study nature in order to achieve many fundamental objectives. Harnessing wind force by utilizing the concept of the Golden Ratio along with examining the natural and physical science that reveals itself in the footprints of creation has resulted in the concept of the present invention Golden Ratio VAWT (GRVAWT). These golden ratio foot prints are Universal and it is outside of the scope or purpose of this document to list them. However, it is relevant to note that these foot prints exist in galaxy spirals, hurricane spirals, sea shells, plants, animals, and in the human body. In reality, they are a fundamental part of the very building blocks of creation. The Creator has chosen these circular, spherical, spiracle and elliptical shapes in the natural, physical and astronomical world around us purposely. These forms vary in size from celestial bodies to atoms and these shapes and ratios are commonly revealed in these golden ratio foots prints. The present invention incorporates these shapes in a harmonious natural blend of golden ratios that produces an unprecedented and perfect adaptation of a natural wind engine which is in balance with the wind itself by its own nature. The golden ratio or golden section is often represented by the Greek letter Phi. Phidias (Phi) and Plato officially acknowledged the golden ratio and termed it the "Divine Proportion" as early as 400 BCE. It was then articulated mathematically by Euclid of Alexandria around 300 BCE and was described in chapter 5 of his books "Elements". The golden ratio is approximately=1.618; and in a line segment where a=1 and b=0.618, then a +b=1.618. In mathematics two quantities are found in the Golden Ratio if the ratio between them is 1 to 0.618 and 1.618 to 1. This can be expressed algebraically as: a+b divided by a=a divided by b=Phi, which also equates to a+b is to a, as a is to b, or mathematically as (1 plus the square root of 5 divided by 2)=1.618 or Phi.

$$\text{formula} = \frac{(PHI)}{\varphi} = \frac{1+\sqrt{5}}{2} = 1.618$$

Examine the formation of a tropical cyclone from a satellite view, having its golden ratio spiral bands emanating from its central eye. This is not a random occurrence, but rather one that repeats itself storm after storm on Earth and on other planets in our solar system. The anatomical features of cyclones are not accidental, they are part of a natural selection process caused by the rotation of earth and its interaction with the atmosphere and oceans. This design is then a "principle of least effort" and maximum efficiency. These cyclones are "nature's choice" for a wind engine. Learning from these observations, has resulted in designing a wind turbine that functions with these same principles and is therefore naturally efficient. By utilizing these golden ratios and shapes, the present invention incorporates this "Regenerative" force that is not available in prior art.

Also, consider that a large bolder in a river current has more force being exerted upon it than a narrow reed. Therefore, the larger the surface area of an object, the more force is able to be exerted upon it, and consequently, greater is the potential to extract power from that object. The boulder has displaced more space in the river current than the reed. The potential speed and torque force of an object as relates to the present invention is also a result of the greater amount of lift force available on the larger wings. This is due to the GRVAWT large surface area wings ability to displace more wind space than the narrow blades of Betz's theory, which enables the present invention to develop more power from the same air space as compared to prior art. Study a knot in a piece of wood and examine the growth ring lines that are being constricted together as they pass around the knot and then follow these lines until they regain normal spacing again (the knot has displaced the space in the tree). This is also apparent when recalling Albert Einstein's theory of relativity wherein he discovered that an object in space (or anywhere) displaces that portion of space and the space itself becomes constricted around that object. Furthermore, the amount of energy available in an object is directly proportional to its mass (E=mc2). Therefore, the greater the size of an object the more space it displaces even if it has a low mass density. Consequently, it is an object of the present invention to utilize its unique golden ellipse vertical profile to displace the wind space. The wind currents can not effectively pass through the apparatus (in rotation) and must compress and accelerate as they pass around the ellipse profile of the rotating turbine. This causes the pressure gradient on the convex wing surface to tighten. This phenomena can be seen in the compression or tightening of isobars between high and low pressure systems when they interact (the tightly spaced isobars depict high wind velocity). Therefore, the greater the surface area of the golden ratio wings, the larger the golden ratio ellipse, which causes a tighter pressure gradient and more wind force is made available to the turbine collection area than in prior art VAWTs or HAWTs.

(d) Need for Present Invention

The present invention has been realized in order to provide a new bio-mechanical GRVAWT concept which provides solutions to prior art VAWT shortcomings (Darrieus and its derivatives and Savoniuos and its derivatives) and to obtain remarkable efficiency without HAWT shortcomings as well as being very quiet and extremely appealing. The GRVAWT is simple and scalable in size or number of wings and easily accommodates any requirement in an urban or commercial environment. Additional embodiments and configurations include usages as in a pump apparatus providing gas or liquid flow output when the rotor is driven by a motor.

It is desirable to have a turbine generator that can make use of any wind from virtually any direction (Vertical or Horizontal) and in any axis, simultaneously. A GRVAWT that is light weight, affordable, reliable and that can produce useful energy at low wind speeds and continue to operate in very high wind speeds without harming itself and with a low loading impact on its base support structure. A new GRVAWT energy conservation apparatus that produces full conservation of angular momentum resulting in economy.

It is also desirable to have a turbine that does not require any additional exotic external airflow deflection techniques or pivotal contraptions such as those used in prior VAWT designs, but rather utilizes the upwind phase of the rotation cycle to produce a driving regenerative force. Again, it is desirable to have a turbine system that can be fixed or mobile, which can be positioned on land or at sea and that is also ideal for roof top and masthead installations. The present invention can also be configured as a mobile unit for DOT to power temporary road signs or as a portable military and emergency turbine that is combined with a diesel generator set and used to provide support in remote or storm stricken locations. As a result of the scalable design, the present invention is a versatile device which can be used as a utility grid source or in smaller applications such as: camping, picnicking, boating, traveling, providing battery charging for fans, lights, audio-video devices, toys, computers and digital devices (as a "Fun" source of portable energy).

SUMMARY OF THE INVENTION

The present invention described herein discloses an axial flow apparatus that is embodied as a vertical axis wind turbine, having: a fixed support shaft which defines an axis of rotation and a plurality of rigid, convex outer surface wings that are operatively coupled around the shaft. These wings revolve around the shaft in an orbit motion when their surfaces encounter gas, liquid or solid masses that are in motion. In the first embodiment, the rotating wheel assembly is operatively coupled to an output object which serves to transfer the kinetic energy to a generator or to perform other useful work. In the secondary embodiment (described in FIG. 14) a generator is located within the central area of the device.

These and other benefits are found in the present invention which provide for a "lift" and "drag" based GRVAWT also having a "draft" effect which is achieved through the overlapping nature of its golden ratio wing design. The present invention (as could be illustrated in the preferred embodiments) incorporates a pentagram geometry and has five approximate golden ratio spiral wings that are rigid and can be composed of fiberglass, carbon fibers, thin metal or of other suitable light weight materials. The GRVAWT can be configured to accommodate a generator in the central area (FIG. 14) or it can be a substantially open area. The rotor wings are taken from an approximate golden spiral section whose imaginary origin is the center of the vertical axis. These golden spiral sections are then lifted up off of the longitudinal horizontal plane (preserving the golden spiral section in 3 dimensions) as though they were "hinged" at the two wing extremity points on the spiral curve into the vertical plane on an incline and a decline and are then projected above and below the horizontal plane in an arc to a predetermined angle of approximately 68.75 degrees in both +/− Y-axis directions. This arc varies in size as the radius of the spiral increases logarithmically. The +/− Y-axis arcs then form an arc whose extremities are curved towards the central axis forming a convex outer wing surface. The size of the wing arc and its radius is directly proportional to the radius of that point on the spiral (Refer to FIG. 8). The top and bottom vertical portions originate and terminate at two points in the horizontal plain forming a substantially crescent oval shape longitudinally along the spiral curve. The complete oval wing is similar in appearance to a lengthwise cutaway ⅓ section of an eggshell (with the rounded end as the inner portion of the wing and the pointed end as the outer portion of the wing). When these top and bottom vertical portions are aligned together, the combined angle of attack is approximately 137.5 degrees which is also the smaller "Golden Angle" of a circle. This golden spiral convex wing forms a logarithmically progressing curved surface which is also similar to the cutaway cross section of a nautilus shell. These golden spiral rotor wing sections are also a golden ratio component of the turbine itself and their placement is part of the golden ratio geometry. The wing extremities originate and terminate on opposite sides of the central axis which produces a "Leverage Arm" that is greater than the radius of the device and which is not common in prior art. These wings overlap one another symmetrically producing a GRVAWT whose profile is generally in the form of a golden ellipse in the vertical or axial plain and having a circular periphery. The bottom half portion of the ellipse is a mirror image of the top half portion which then has an opposite array of wing halves that can be matched up vertically or can be offset. In the event that the top and bottom portions are to be aligned vertically, they can be molded as one piece. (These elements will become more apparent in the following detailed drawing descriptions FIG. 3-8). In such cases, the wing is either composed of or attached to a central rotor wheel-to-batten coupler which also provides additional radial rigidity to the wing (FIGS. 1A, B and C). In addition, it is intended that the wings may also be skewed, pitched or twisted and that the top and bottom wing sections need not be symmetrical or equal in shape or size. Certain other alterations not described herein may also be effected that do not deviate from the scope, spirit and concept of the present invention.

The ideal height to width ratio of the overall turbine is approximately 1 to 1.618 (a golden ratio) and this then comprises the golden ellipse oval shape in the vertical plane. The major axis of the ellipse being the width (horizontal) and the minor axis being the height (vertical) of the GRVAWT. This golden ratio ellipse results in a low center of gravity and a low cross section which has no vertical fixed point source reflective aspect angles to oppose the wind directly and is therefore a true embodiment of a "principal of least effort". Consequently, the golden ellipse oval shape profile results in an ideal embodiment for maximum efficiency of the present invention bio-mechanical GRVAWT.

In another object of the present invention, a novel golden ratio "hourglass" (comprised of two golden ratio triangles) turbine-to-generator rotary transmission coupler is utilized. This coupler provides for a totally coherent and diagonal transfer of the torque force of the rotating apparatus to the output device and then to the generator(s). This unique coupler mechanism enables the turbine to produce a significant mechanical advantage without gear box reduction losses. This design also provides for the ability (if desired) of the present invention to incorporate a novel concept that mimics the orbital motions of a planet and a moon or satellite, which then increases the overall torque force available at the rotor shaft even further. This "coupler" is a scalable design that is an integral part of the overall concept and is specifically proportioned and tailored to the size of each turbine. These elements then maintain the golden ratio proportions in almost each aspect of the present invention resulting in a harmonious, coherent and natural balance of complete synergy that is not found in prior art VAWTs or HAWTs.

In optional aspects of the present invention, the device is intended to be capable of operation over a wide range of wind velocities by incorporating a multiplex generator load assembly (in the first embodiment). In this version, the device incorporates a RPM sensor which automatically inserts additional generator loads as needed. This allows the GRVAWT to cut in at extremely low wind speeds and to continue to operate in very high wind conditions while maintaining the average RPM within a safe region. A simple logic controller and multiple generator loads provides for added flexibility. In addition, the use of an averaging interval correlation sensor/controller enables very smooth transitions of the generator loads by filtering the insertion selections over time and not allowing the actuators to be influenced by short term gusts.

In various aspects of the objects of the present invention a novel bio-mechanical GRVAWT that solves many of the inherent problems of prior art devices is provided. A GRVAWT that is, uniform, rugged, compact, efficient, cost effective, quiet, very attractive and is (as a result of its simple and natural design) perfectly in phase and balance with the wind itself. In addition, the golden ellipse profile and the relatively spherical peripheral shape of the turbine causes the device to continue to collect wind force energy from above or below the turbine (vertical wind), even though the main thrust and propulsion of the turbine is from direct horizontal wind impact (parallel to the ground).

Therefore, it is an object of the present invention to revisit these golden ratio footprints in order to provide a GRVAWT which challenges (with all due respect) the conventional Betz's theory of the "ideal wind turbine", as well as to oppose the orthodoxy of prior VAWT technology. This new GRVAWT design proposes a totally new non-contemporary concept of harnessing wind energy with its golden spiral wing. Betz's theory proposes minimal surface area of vanes and the narrow aspect ratio of thin blades that minimize air flow interference through the turbine. The ideal turbine in the Betz's theory approach utilizes a crosswind airflow lift concept with fewer vanes and with minimal surface area. Betz's theory VAWT (Darrieus) has been constantly re-invented and remains relatively inefficient. The unique present invention teaches completely "Outside of the Box" of prior VAWT ideas; it proposes a plurality of relatively large convex outer surface area golden spiral wings overlapping one another and collectively comprising a rotating golden ellipse profile that effectively divides and compresses the wind flow around it as though it were a solid object.

More particularly, the golden spiral wing incorporates a smooth geometrically changing curved surface which is not easily upset by impulse gusts or shifts in wind direction, (as are encountered in prior VAWTs and HAWTs). Consequently, these wings transfer the additional impulse forces into positive regenerative motion which serves to increase the rotor's linear momentum. Also, the unique golden ratio spiral convex wing design keeps the angle of incidence low which then serves to keep the air flow smooth and even, rather than turbulent. This results in a very low resistance that produces a more efficient transfer of the wind force into kinetic energy at the rotor, which then increases the torque force while altering the linear motion of the rotor in a smooth and positive manner rather than experiencing unwanted vibrations and oscillations (as are experienced in prior VAWTs and HAWTs). The golden spiral convex curved wing outer surface keeps the "Forward Component" of the lift force (LF) forward on all "angles of attack" during each phase of the rotation cycle providing a constant forward thrust on all of the wings without any stalled angles in the air stream. This serves to maintain the "zone of negative pressure" relatively constant along the exposed cord length of the wings which is not possible in prior art arched aerofoil section devices. Additionally, these golden spiral wings incorporate the whirlpool movement which underlies spirals termed as "Balance in Motion", which further assists in producing maximum efficiency of the present invention. An example of this principle is what keeps the axis of Earth pointing in the same direction while spinning on its own axis (aside from precession).

In further aspects of the present invention, the golden spiral convex wing utilizes the law of conservation of momentum in providing a unique surface for elastic collision to occur (during gusts or wind shifts) in which the momentum and the kinetic energy is conserved. This provides an example of Sir Isaac Newton's 2nd law of motion wherein the net force and the acceleration produced by the "impulse or external" force are in the same direction. This is accomplished as result of the low cross section of the golden ellipse oval profile and the overlapping wing assembly that provides for the remarkable ability of the present invention GRVAWT to react as a "Compound Unity" rather than to behave as a turbine of many individual parts (as do prior VAWTs and HAWTs which are vulnerable to loading stresses, flexing, bending, twisting, misalignment and balance considerations).

LIST OF DRAWING REFERENCE NUMBERS

Figure 1A:
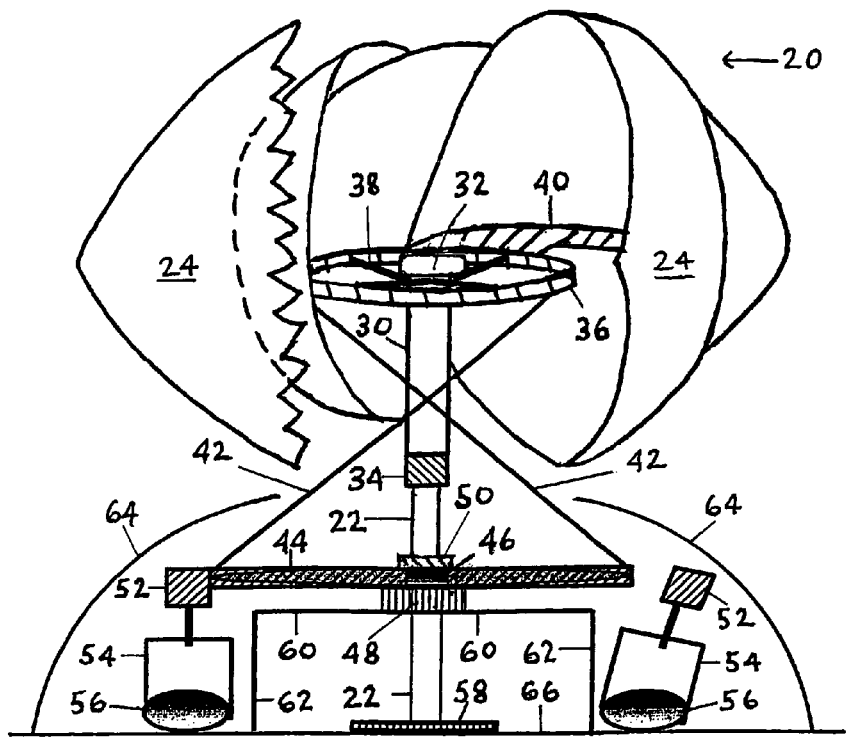
FIG. 1A is a cut away partial perspective view the of golden ratio vertical axis wind turbine electric generating system.

20 Golden Ratio Vertical Axis Wind Turbine
22 support shaft
24 golden ratio spiral wing
25 wing/batten fasteners
26 inner wing end
28 outer wing end
30 main bearing case
32 top main bearing case locking nut
34 bottom main bearing case locking nut
36 wheel
38 wheel/main bearing case radial struts
40 wheel/wing batten
41 wheel/batten fasteners
42 wheel to output gear diagonal struts
44 output gear
46 output gear bearing
48 output gear bearing base support and spacer 50 output bearing top lock nut
52 generator shaft gear
54 generator
56 generator actuator
58 support shaft base support
60 support shaft deck
61 support shaft deck lock nuts
62 support shaft deck vertical supports
64 hemispherical retractable dust cover
66 apparatus base platform
68 pentagram
70 outer circle
72 inner circle
74 pentagon
76 central axis
78 golden ellipse
80 wind
82 line segment A short line=1.0
84 line segment B long line=1.618
86 axis of perspectivity
88 upper wing array
90 lower wing array
92 pentagram point
94 drag cycle
96 leeward cycle
98 windward cycle
100 volcano skirt
102 thermal air
104 bottom axle bearing
106 axle shaft
108 top axle bearing

DETAILED DESCRIPTION OF THE SEVERAL VIEWS OF THE DRAWINGS

Figure 1B:
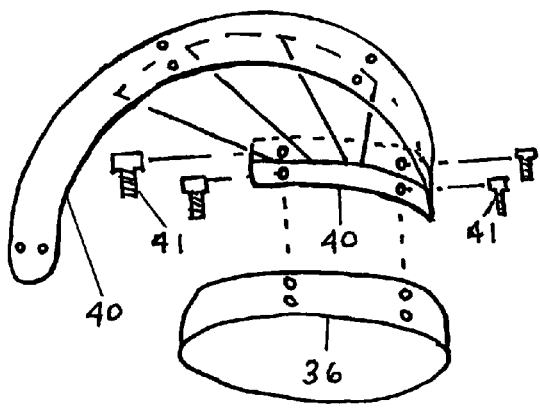
FIG. 1B is an exploded perspective view of the wheel and wing batten attachment.
Figure 1C:
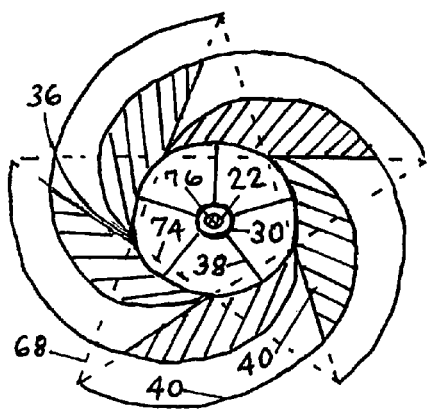
FIG. 1C is an orthogonal top view showing the turbine central axis and associated elements.

Referring in detail to accompanying drawings wherein certain elements of the invention are disclosed by numerals and, more specifically in FIGS. 1A, 1B and 1C, a Golden Ratio Vertical Axis Wind Turbine (GRVAWT) 20 is illustrated in the first embodiment. In FIG. 1A the GRVAWT 20 is shown with a wing 24 removed in order to expose the interior elements and is shown in a cutaway partial perspective side view. The GRVAWT 20 is generally comprised of a support shaft 22 and a plurality of golden spiral rotor wings 24. The rotor wings 24 are rigid and can be constructed of fiberglass, metal, carbon fibers or other suitable light weight materials. The rotor wings 24 are symmetrically disposed and operatively attached to the wheel 36 through a plurality of wheel/wing battens 40. The wheel 36 is then operatively connected to the main bearing case 30 with a plurality of radial struts 38. The top main bearing case locking nut 32 secures the top of the main bearing case 30 on to the support shaft 22. The bottom main bearing case locking nut 34 secures the bottom of the main bearing case 30 on to the support shaft 22. The wings 24, wheel 36 and main bearing case 30 collectively revolve around the support shaft 22 when the wings 24 encounter air flow currents from any direction.

A rotary transmission converts the foregoing motion into a selected energy output (e.g. electrical energy). In particular, the wheel 36 is operatively connected to the output gear 44 by a plurality of wheel to output gear diagonal struts 42 which collectively comprises a pair of golden triangles in an hourglass design. It is to be understood that the triangles may also be solid funnel shapes and that they may or may not be attached to the main bearing case 30 at the illustrated point of intersection. The output gear 44 revolves around the support shaft 22 through output gear bearing 46 which is held in place by output bearing top lock nut 50 and by output gear bearing base support and spacer 48. The support shaft 22 is intermediately supported by the support shaft deck 60 which can be fabricated of rigid foundation material such as metal or other suitable composites. The support shaft deck 60 is supported by the apparatus base platform 66 though a plurality of support shaft deck vertical supports 62. The support shaft 22 is terminated into the support shaft base support 58 which is then fastened to the apparatus base platform 66. The output gear 44 is coupled to generator shaft gears 52 by means of rotating the generators 54 into contact position with the generator actuators 56. The generator actuators 56 are controlled by an RPM sensor and logic controller (not shown). FIG. 1B is a exploded perspective view of the wheel 36 being attached to a single wheel/wing batten 40 with fasteners 41. This is only intended to provide an example of a means of attachment and it should be understood that other means which are common in the industry may also be used. In addition, several holes are shown along the outer length of the wheel/wing batten 40 that are intended to be used in conjunction with wing fasteners 25 (not shown) in order to provide a means of attaching to the wings 24. FIG. 1C is a top orthogonal view of the support shaft 22 and main bearing case 30 with the upper shaft locking nut 32 removed (not shown) in order to expose the central axis 76. The main bearing case 30 is attached to the wheel 36 with five radial struts 38. The five wheel/wing battens 40 are disposed from a point on the dotted pentagon 74 to the outer points of the dotted line pentagram 68. The turbine is shown here in a configuration to rotate CCW (Counter Clockwise). In addition, the entire assembly as shown in FIG. 1C could be molded as one piece (with the exception of the support shaft 22) including the golden spiral wing 24 (not shown) for use in smaller portable models which are able to provide outdoor "on the go" battery charging for digital devices, cameras, computers, and toys etc. . . .

Figure 2:
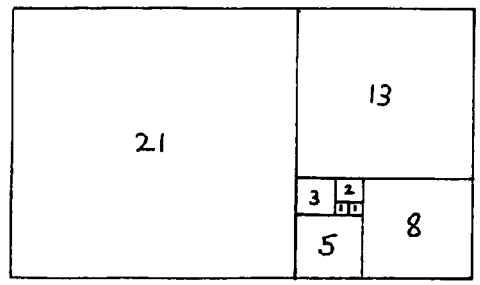
FIG. 2 illustrates a Fibonacci sequence of squares used in making rectangles that is used as a base for "approximating" golden ratios.

FIG. 2 illustrates the progression of square sizes and their sequence in order to create a series of golden rectangles. The concept was discovered by Leonardo de Pisa around 1228 AD and he became known as Fibonacci (hence the term Fibonacci squares). The series of numbers 0, 1, 1, 2, 3, 5, 8, etc., are used to develop progressively larger rectangles. Consequently, by adding the prior two numbers in the sequence together, their sum then produces the next number in the sequence; 0+1=1, 1+1=2, 1+2=3, 2+3=5, 3+5=8, etc. Therefore when dividing one number by the one adjacent to it, produces an "approximate" golden ratio (1.618). This becomes accurate as the numbers are carried out into infinity. In the present invention the central axis origin is located between the two 1's.

Figure 3:
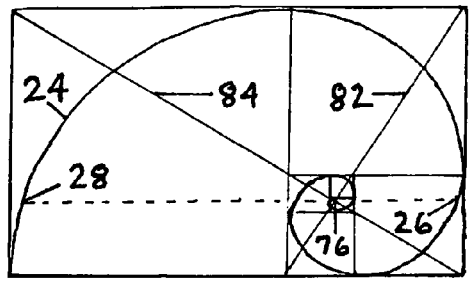
FIG. 3 is an illustration of a golden spiral "approximate" as is derived from the Fibonacci square sequence of FIG. 2 with diagonal quarter turn intersecting sections.

FIG. 3 illustrates a golden ratio spiral approximate which is produced by drawing a ¼ turn arc circle in each successive Fibonacci square as it progresses in size from the central origin. The center of the spiral is shown with the spiral, triangles and rectangles converging at the central axis 76 of rotation of the present invention. The spiral section taken for the wing 24 has its two points on the spiral (intersected by dotted line), this indicates a 180 degree section that can be used in the present invention at inner wing end 26 and outer wing end 28, also the straight line distance between these is approximately=1 and the length of the curved line is approximately=1.618. It is to be understood that the Fibonacci sequence is not a true natural logarithmic or equiangular golden spiral; it is an approximate, as this spiral is comprised of squares in a rectangle. Also the ratio between diagonal line segments A 82 and B 84 is equal to 1.618 (where A is equal to 1 and B is equal to 1.618). In addition, these segment lines also depict quadrants or ¼ turns on the spiral whose radius is increased by 1.618 each ¼ turn of spiral growth (a logarithmic golden ratio progression). As used herein, "approximately a golden ratio spiral" and "substantially conforming to a golden ratio spiral" or like language means that the spiral either features the golden ratio precisely, or approximates the golden ratio by increasing in radius each quarter turn by a factor that becomes progressively closer to the golden ratio as the size of the spiral increases.

Figure 4:
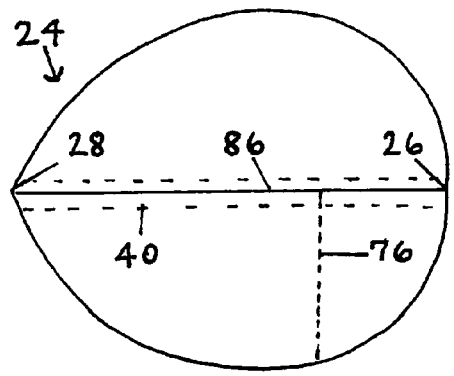
FIG. 4 is an orthogonal view of top and bottom golden spiral wing sections intersected by the axis of perspectivity and the central axis of rotation.

FIG. 4 is a one dimensional side orthogonal view of a golden spiral wing 24 which is being intersected by the horizontal plane or axis of perspectivity 86 (shown in solid line) and the vertical plane at the central axis 76 (shown in a single vertical dotted line). The top half section of the wing 24 is an equal and opposite image of the bottom half section of the wing and these are divided by the axis of perspectivity 86. Each wing section is derived from the spiral section as shown in FIG. 3. The wing 24 has a convex outer surface (not shown) that would cause a CCW rotation. The wheel/wing batten 40 (shown as a pair of horizontal dashed lines) is attached to the wing 24 along the axis of perspectivity 86 as described in FIG. 1C. Rene Descartes (who later changed his name to Cartesian) discovered the concept of analytic geometry which came to him in dream around the year 1619 and became known for the "Polar and Cartesian coordinate system". Descartes then expressed the golden spiral with the polar equation as:

$$r = ae^{b\theta} \text{ formulas} = \theta = \frac{1}{b}\ln(r/a)$$

or θ(theta)=1 divided by b times ln(r/a) Which basically states that the spiral radius increases as a function of the golden ratio-Phi. While describing a geometric space, Descartes also stated that the lines on which the paired co-equal sides meet is called the "axis of perspectivity" 86 which is also the horizontal plane of the wing 24. This axis of perspectivity 86 is then intersected at two points on the spiral; the originating or inner wing end 26 and the terminating or outer wing end 28 (forming a substantially crescent oval wing shape). Therefore, the lines of the projective geometry intersect on the axis of perspectivity 86 at two points (26 and 28) defining a space which forms a 3 dimensional golden spiral convex curved outer surface and a concave inner surface for each rotor wing. This then forms a partially closed area of space in the general shape of a spiral crescent wing. The first set of intersecting lines originates near the central axis of rotation 76 at inner wing end 26 and progresses upward and downward to the end of the wing 28 in arcs which increase logarithmically on a projected spiral trajectory outward to the wing periphery 28. Each arced wing half portion (being co-equal and opposite) is projected above and below the axis of perspectivity 86. This design produces the convex 3D golden spiral wing which maximizes the torque available on a rigid surface. Recall the relationship of a convex surface as it relates to torque force in order to realize the power available in this new golden spiral wing design.

Figure 5:
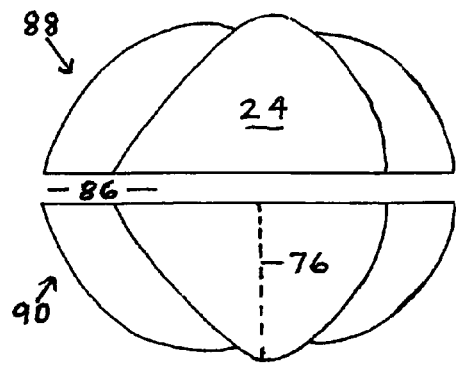
FIG. 5 is a side orthogonal view of an array of top half wing sections and bottom half wing sections separated by a gap in order to show distinction.

FIG. 5 is a side orthogonal view of the upper array of wing halves 88 and the bottom array of wing halves 90, configured herein with half wings 24 and being separated by a gap or space along the axis of perspectivity 86. The central axis 76 of rotation is shown by the dotted line and the device is configured to rotate CCW (CounterClockwise). Combining arrays without the gap produces the golden ellipse profile of the GRVAWT 20.

Figure 6A:
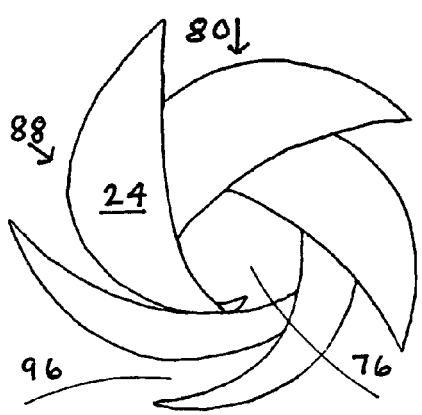
FIG. 6A is a top perspective view of the top half portion of the turbine showing the overlapping wings, the central axis region and evacuation spaces between wings.
Figure 6B:
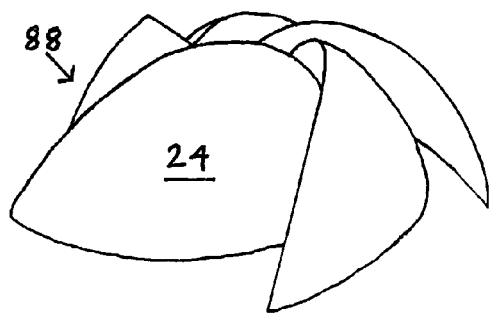
FIG. 6B is a top side perspective view of the top half portion array of the turbine showing the overlapping wings.

FIG. 6A is a top perspective view of the upper array 88 of wing half sections which illustrates a open central region occupying the space around the central axis 76 as well as the evacuation spaces 96 between each wing 24. This provides a means for evacuating the expended air, similar to those spaces found between the spiral bands of a hurricane. The true wind is shown herein as 80. These spiral wings 24 have been taken from a 180 degree golden spiral section that originates near the center of the turbines axis 76 (as shown in FIG. 3). However, it is to be understood that the present invention is not to be limited to that section alone, and other portions (more or less than an arc of 180 degrees) of the spiral are included within the scope of the present invention. Also, the use of a ridged external surface that terminates at the trailing edge of the wing in a series of serrated sinusoidal curves (not shown) can be added to enhance the air flow and provide more lift in some applications (as has been proven in wind tunnel testing of whale flipper shapes at Georgia Tech). These "ridges" are similar to those found on the Cockle sea shell (which also has golden ratio proportions), and are intended to be within the scope of the present invention. Additionally, as with the cockle, the outer wing tip may be substantially rounded. FIG. 6B is a side and top perspective view of the upper array 88 of wing halves illustrating the manner in which the wings 24 overlap one another in a symmetrical sequence. In this view the convex outer surfaces of the wings 24 are disposed so as to cause a CCW (Counter Clockwise) rotation to occur in the present invention when encountering air flow currents from any direction. This view also reveals the large surface area of the wings 24 and provides a top half image of the overall geometry of the device.

Figure 7:
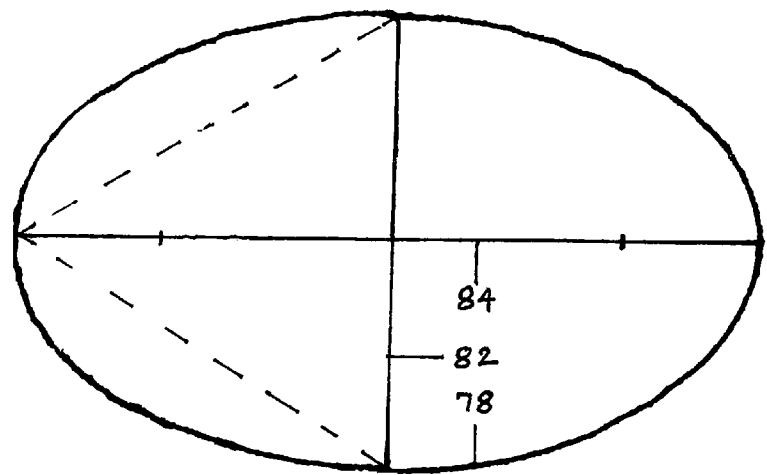
FIG. 7 is a side view illustration of a golden ellipse shape with its golden ratio proportions.
Figure 8:
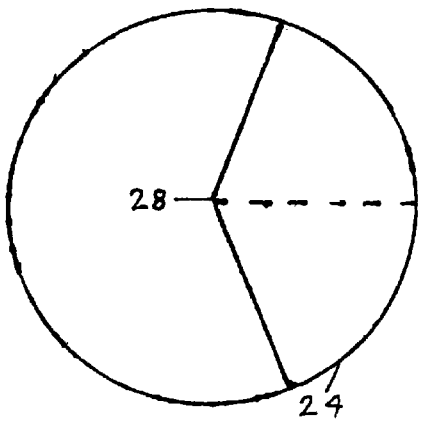
FIG. 8 is an illustration of a circle with its golden ratio sections and wing proportions.

FIG. 7 is an illustration of a golden ellipse shape 78. The width or major axis of the ellipse is 1.618 times longer than the height or minor axis of the ellipse. The present invention as could be viewed in the preferred embodiment is a golden ellipse whose width is approximately 1.618 greater than its height. Therefore the ellipse has its two axes in the golden ratio (vertical line segment A 82=1) and (horizontal line segment B 84=1.618). Additionally, a dotted line triangle having an angle of 68.75 degrees is inherent in the ellipse geometry which is also shown in FIG. 8. Also, 68.75 is the same inclination and incident angles of the wing half section's leading edge as is further depicted in FIG. 6 B.

FIG. 8 is an illustration of a circle with its golden ratio proportions. The smaller area shown with a dotted line at the center is equal to 137.5 degrees of the circle and the larger area is equal to 222.5 degrees. The smaller golden angle of a circle is 137.5 degrees and has a ratio of 1 to the larger area of 1.618. Therefore 137.5 degrees times 1.618 is equal to 222.5 degrees, which is the larger portion of the circle. Consequently, by adding the smaller golden angle of the circle 137.5 degrees to the larger angle of 222.5 we have a full 360 degrees. In a perspective view; the golden spiral wing halves of the present invention are projected vertically (both up and down) off of the horizontal plane in an arc to an inclination and declination angle of +/−68.75 degrees. These angle areas are illustrated by the intersecting angles of the dotted line and the solid line. The area above the dotted line is +68.75 and the area below is −68.75 degrees. In addition, the horizontal or longitudinal plane is shown here as the dotted line of the wing. Furthermore, the point of convergence of the dotted line in the center of the circle equates to the outer wing end 28 of FIG. 4. Combining the top and bottom parts of the wing halves together (as shown in FIG. 4) produces an incident angle of 137.5 degrees (the smaller golden angle of a circle). In another perspective view; the vertical surface of the wing is depicted by a portion of the circle that is within the solid lines. In this view the radius is the dotted line and the arc of the circle within solid lines is a cross-sectional snap shot of the convex wing at a specific point along the spiral curve. This 137.5 degree section then shows a snap shot of the vertical arc which is formed along the horizontal spiral curve to form the wing 24. As the radius of the horizontal spiral increases, the size of this vertical arc section would also increase proportionally. The vertical arc length and the elevation angles increases or decreases in direct proportion to the radius of that specific position along the golden spiral wing. The portion above the dotted line is the vertical +Y-axis projection of the wing and the portion below the dotted line is vertical −Y-axis projection of the wing. It is to be understood that the top and bottom portions of the present invention need not be aligned in such a fashion in order to remain within the scope the present invention and that they may be purposely offset, skewed, angled or pitched. Furthermore, these angles of projected inclination and declination need not be adhered to precisely in order to remain within the scope and spirit of the present invention and departure from these may be appropriate.

Figure 9:
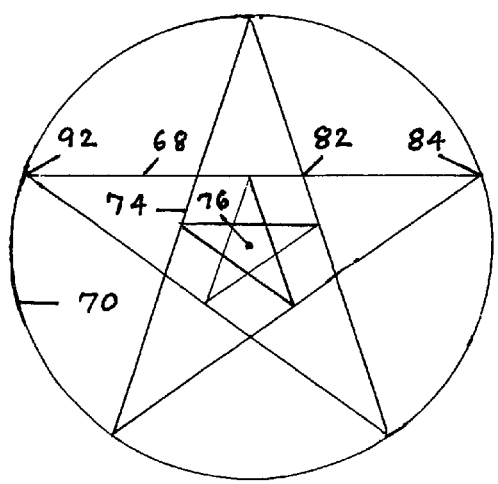
FIG. 9 is a top view illustration of two pentagrams within a circle and a pentagon in the center as well as the relative golden ratio proportions.

FIG. 9 illustrates a circle 70 and pentagram 68 with an inner pentagon 74. The pentagon 74 has an inner pentagram and this continues into infinity. The dot in the center of the small pentagram represents the center of rotation, the central axis 76 and the imaginary origin of all of the golden spiral wings. The points on the cross arm of the large pentagram 68 exhibit the golden ratio proportions. In this view line segments A 82 and B 84 both originate at pentagram point 92 and are superimposed upon each other. The length of line segment A from pentagram point 92 to 82 is equal to 1, and the length of line segment B from pentagram point 92 to 84 is equal to 1.618. Consequently, the distance from point 82 to 84 is equal to 0.618. Also notable is that the distance from any point (tip) of the pentagram star to next point is equal to 1.

Figure 10:
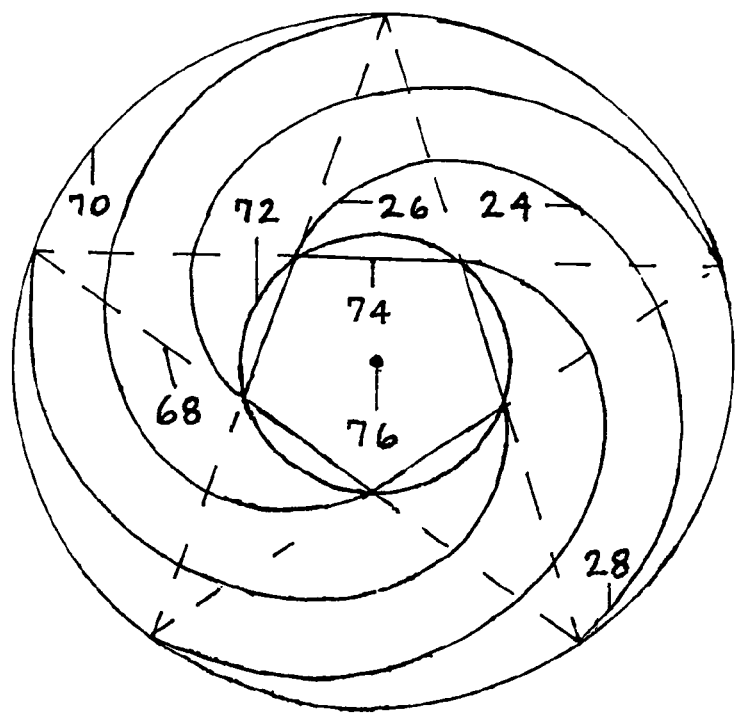
FIG. 10 is a top view illustration of a pentagram within a circle (as in FIG. 9), with an inner circle encompassing the pentagon points as well as the golden spiral wing sections and depicting the overall geometry of the GRVAWT.

FIG. 10 is an illustrative top view of the geometry of the present invention containing an outer circle 70 with a pentagram 68 (shown in dashed lines), an inner circle 72, a pentagon 74, and the golden spiral wings 24 connecting one circle to the other circle in 180 degree spiral arcs. The entire relationship is symmetrical and made up substantially of golden ratio proportions. Where the five points of the pentagram 68 touch the outer circle marks the tips of the five golden spiral outer wing ends 28. Also, the five points where the pentagon 74 touch the inner circle 72 marks the origin of the five golden spiral inner wing ends 26. Although the wings are not numbered individually, all of the remaining wings are attached and positioned in like manner (as shown). The central axis 76 is shown in the center of the inner circle 72. This view represents the ratios and relationships of the preferred embodiment of the present invention. The outer circle 70 represents the periphery of the apparatus and can be of any size, enabling it to be scaled to fit any requirement while preserving all of its relative proportions intact. The golden ratio is used to determine the overall proportions and ratios of the present invention GRVAWT 20 producing a perfectly balanced apparatus. Furthermore, an outer ring may be incorporated connecting the outer wing ends 28 together, increasing structural support.

Figure 11:
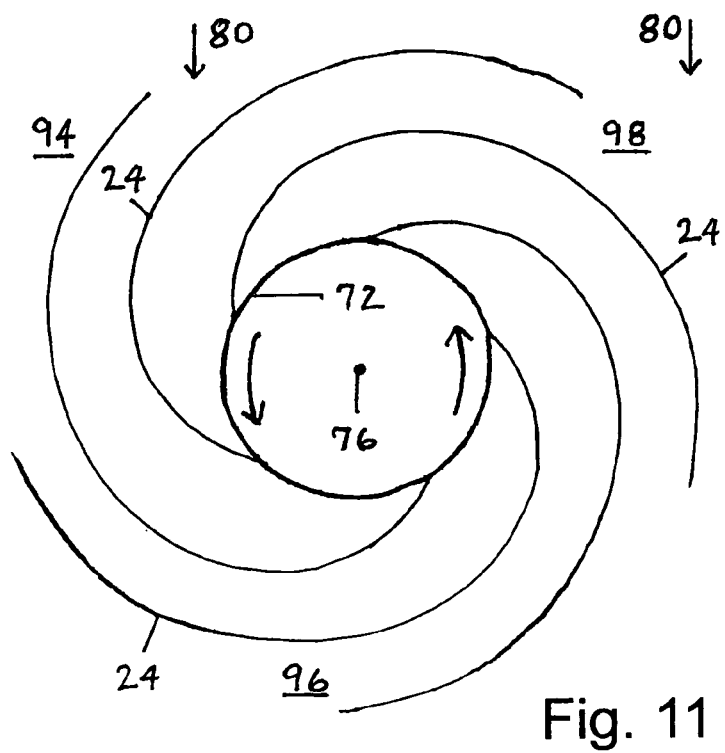
FIG. 11 is an illustration of the GRVAWT in motion and each phase of the cycle.
Figure 12:
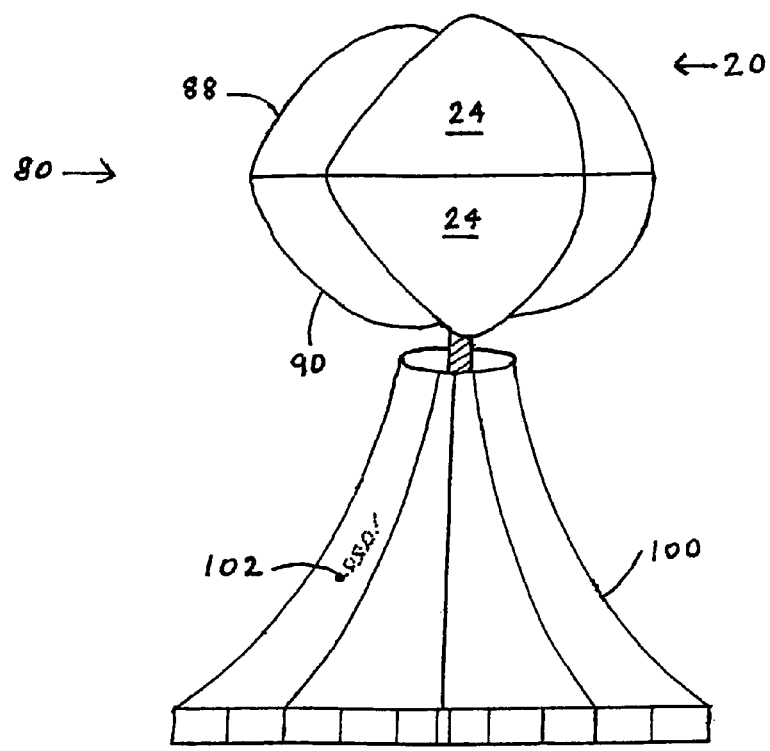
FIG. 12 is an assembled side view illustration of the turbine system employing a "Volcano" shaped eternal base beneath it.
Figure 13:
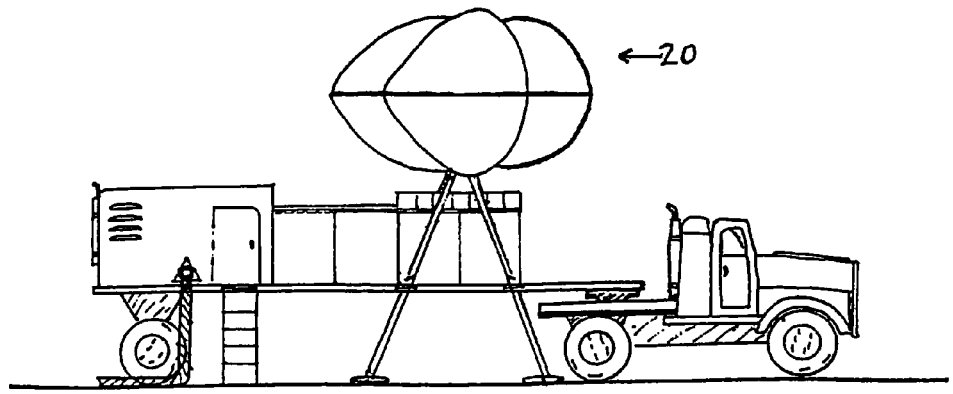
FIG. 13 is an assembled side view illustration of a turbine system configured as a mobile unit with an auxiliary diesel generator set used for military and emergency support.

Operation of the Invention FIGS. 11-13

FIG. 11 is an illustration of the present invention in motion as viewed from above. The wind 80 is shown at the top of the illustration which is also perpendicular to the axis of rotation. The apparatus is shown rotating counter clockwise (CCW) as depicted by the interior arrows. The central axis 76 is also the vertical axis and defines the axis of rotation, which is located within the inner circle 72. The down wind or "drag" portion of the cycle is depicted by area 94. The leeward or "draft" portion is depicted by area 96. The upwind or "lift" portion is depicted by 98. The wings 24 are shown as golden spiral bands extending outward from the circle 72. Each wing 24 is shown cross sectionally with a logarithmic spiral sectional line extending between the inner and outer end portions of the wing. Each spiral sectional line shown in FIG. 11 extends completely within a plane (represented by the plane of the drawing sheet) which is perpendicular to the axis of rotation, central axis 76.

Initially, an "impulse or external" force of wind 80 acts upon the surface of the wings 24 and the "drag" portion of the cycle will begin (as per Newton's $1^{st}$ law of motion, inertia—object at rest). The wind 80 is "pushing" against the wings 24 as in area 94 and this is a result of the "true" wind 80. As the wind increases, it surpasses the threshold level amount of "impulse" force that is required to achieve the initial "turning effect". The wind force has ultimately overcome the turbine's mass, friction and static equilibrium. The unique spiral wing configuration places its inner and outer ends on opposing sides of the center of rotation which produces a leverage arm that passes through and around the axial bearings allowing the apparatus to begin rotating in extremely light wind conditions. This was described and illustrated in the positional relationships of 26 and 28 to 76 in FIG. 3.

As the turbine begins to rotate, the angle of incidence of the wind 80 on the convex wing 24 is constantly changing. This occurs as a result of the fact that the curvature and the dimensions and the aspect angles of the wing 24 are changing logarithmically and 3 dimensionally (as described in FIGS. 4 and 8). The curved wing 24 surfaces cause a deflection of the flow of air and an "Equal and Opposite" reaction to occur (Newton's $3^{rd}$ law of motion). The low resistance of the convex wing 24 at position 98 and the golden ellipse vertical oval profile allows this device to "cut in" at very low wind 80 speeds due to the coherent balance of the golden ratio shapes, proportions and geometry.

Once the speed of rotation exceeds the wind 80 speed, the TSR (Tip Speed Ratio) is now greater than 1 and the "lift" (circulation effect or a suction force) portion of the cycle becomes more effective in the windward area 98. At the same time the "drafting or drawing" effect of the wings 24 on the leeward area 96 of the turbine begins. This "drafting" can be likened to a moving tractor trailer that creates a suction force in its wake. This force acts upon each of the wings as they move into the leeward side 96 of the turbine. This draft force then serves to evacuate or to exhaust the expended air of the device and eliminates any back pressures as the device is ventilated (as illustrated in FIG. 6A). Likewise, this behavior is similar to that of a tropical cyclone, complete with a calm center and pressure differentials on the wing 24 surfaces. The turbine is now reacting as a centrifuge, expelling air from its center and leaving the interior portion relatively calm.

As the turbine rotor's speed of rotation continues to increase, the "apparent" wind being exerted on the wing's 24 surfaces in the windward phase 98 also increases. The "apparent" wind is the resultant wind force created by the collision of the revolving wings 24 "against" the true wind 80. As the revolving wings move faster "against" the wind, the effective combined wind force being applied on their surfaces also increases. The air is being compressed against the convex curved surfaces of the oncoming wings. This is similar to the "Doppler" effect of a moving target approaching a Radar antenna and compressing the RF frequency directly proportional to the target's apparent velocity. The air deflection is minimized due to the spiral and arced curvature of the wing. Consequently, the air must accelerate to pass beyond the wing itself (this compression of the true wind is proportional to wing velocity). By applying Daniel Bernoulli's "lift" theory on the wing's curved surfaces, the result is a low pressure differential and a torque moment on the outer surface of the convex wings that propels the turbine even faster. As the rotor speed increases, the "apparent" wind moves forward on the wing 24, thereby creating more lift and more speed. The greater the differential in air flow velocities between the interior and exterior wing surfaces, the greater the "lift" force that is being exerted on the wing 24. In this mode of operation the "apparent" wind is propelling the turbine (not the true wind alone). Now that the wing tip speed has surpassed the true wind speed, the wings are able to generate forward lift force on all of the wings in each phase of the rotation cycle for a full 360 degrees SIMULTANEOUSLY. This is accomplished due to the harmoniously syncopated and unified effort of all individual elements in complete "Synergy" in order to propel the rotor wheel. This is due to the wings moving through the air fast enough to create apparent wind even on the leeward side of the turbine. Consequently, the effective wind force quadruples as the velocity doubles (the square of the velocity). Therefore, the faster the rotation of the turbine wing the greater the "apparent" wind force acting upon it in each quadrant. In effect the "apparent" wind is now greater than the true wind and the device is "making its own apparent wind increase" and by recalling the laws of angular and linear momentum, the kinetic energy available at the rotor is both conserved and increased even further (also refer to paragraph 32).

More particularly, as the rotating turbine comes up to speed, it begins to exhibit centrifugal force effects on the wings and this causes the device to react as a gyro, which then produces the effect of maintaining a fixed plane in space. This is accomplished through the centrifugal force itself (which is available on an object in rotation) which also causes an object to move away from its center axis 76. Each of the wings 24 are in their own orbit around the central axis 76 (even though being firmly bound to the wheel 36 of FIG. 1A) creating a vortex effect inside of the turbine circle 72 which alters the pressure differential further. As the wings 24 encounter a gust or a shift in the wind force or direction they are able minimize any degenerative impact and utilize the additional impulse in a regenerative manner due to the bio mechanical nature of the GRVAWT 20 as per Newton's 2nd law of motion; wherein the wings 24 will accelerate in the direction of the wind force. This becomes significant in the present invention as the turbine's bearings are located around its axial center (as well as is the "center of effort and center of gravity"). Consequently, as the turbine rotates the wings 24 are now pulling outward against each other which causes the turbine to effectively "hover" somewhat in its own space. This action then serves to reduce or to oppose the gravitational forces being applied to the turbine's mass which reduces bearing loading effects while accomplishing a perfect "balance in motion" that is unattainable in prior art devices. Obviously, this then reduces the frictional and energetic losses of the device and renders it yet even more efficient. This is accomplished through the design, placement and alignment of the golden ratio spiral wings 24 and the overall golden ratio geometry of the biomechanical GRVAWT 20.

The present invention is illustrated in FIG. 12 as a GRVAWT 20 electrical system which is configured as a fixed positioned device which is mounted above a hollow "volcano" shaped pedestal skirt 100. As the wind 80 is not a constant force and periods of calm conditions do occur in most localities, it is desirable to take advantage of the ability of the present invention to harness air flow from virtually any direction. In this application, the base of the "volcano" skirt 100 is elevated up off of the ground by a plurality of vertical supports creating a space or gap above the ground where the outside air is drawn into the inside of the bottom of the skirt 100 by convection. The exterior skirt material is black and as it absorbs the sun's light, the air inside the skirt 100 becomes heated. The heated internal air 102 then rises along the exterior surface of an inner cone shaped deflector which has an upward spiral ridged surface whose base is at ground level (not shown). This spiral ridge causes the internal heated air to circulate (Counter Clockwise) CCW in an upward circular motion inside of the skirt 100, becoming an internal thermal "whirlwind" 102. This CCW rotating upward air current then exists the top of the volcano on to the bottom array 90 of wings 24. As the hot air rises within the "volcano" it produces a void which must be replaced. This void produces a convective force to draw outside air into the apertures on the bottom of the skirt 100 replacing the void caused by the rising internal air 102. This effect is similar to an afternoon coastal sea-breeze which is caused by sun heated air rising along the coastal land. The rising internal air 102 flow provides an "impulse or external" force which causes an equal and opposite reaction (Newton's 3rd law of motion), which acts upon the bottom array 90 of the turbine's spiral wing 24 surfaces which were previously at rest in a static equilibrium (Newton's $1^{st}$ law of motion). This impulse force overcomes the turbine's resistance and causes rotation of the GRVAWT 20 to begin (achieving the turning effect). In addition, the exterior of the skirt 100 is curved upward so that it deflects a portion of the wind 80 up the skirt's surface 100 and on to the bottom array of the turbine's wings 90. The external wind 80 also strikes the top 88 and bottom 90 portions of the turbine wings 24 directly in order to combine all wind forces (internal and external) in the common goal of rotating the GRVAWT 20. The circular top portion of the skirt 100 is relatively narrow as compared to the wider circular base and this serves to concentrate and accelerate both the interior and external air flow velocities unto the bottom wing array 90.

FIG. 13 illustrates an example of the present invention in a mobile configuration. The GRVAWT 20 is combined with a diesel generator unit which provides power support for remote location or emergency and military applications. The rear portion of the trailer houses the generator and the controller unit for the mobile power station. The controller is used to convert the turbine's D/C voltage output into a usable NC voltage that is synchronous in phase and amplitude with the generator or any other external source. The turbine of the present invention is shown being supported by legs that are attached to the trailer's sides and pads on the ground. Additional supports are included that detach from the trailer's midsection and deploy outward at right angles from the trailer itself (not shown). The mobile unit includes a maintenance platform beneath the GRVAWT 20 and a cable trough, both being supported with a plurality of vertical supports that are attached to the top of the trailer bed. The entire system can be erected with a gin pole assembly (not shown) which makes additional crane support unnecessary.

Figure 14:
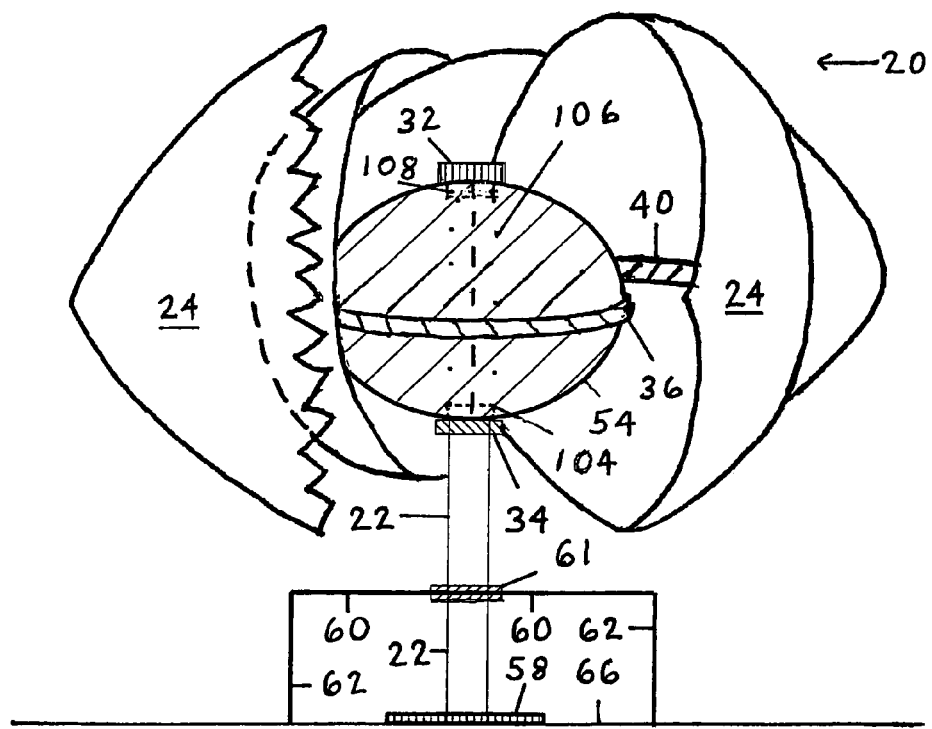
FIG. 14 is a cutaway side perspective view of the GRVAWT with a central electric generator occupying the space around the central axis of rotation (2nd embodiment).

FIG. 14 is a cutaway partial perspective side view of the 2nd embodiment of the present invention GRVAWT 20 with one of the wings 24 removed to expose the interior elements. A centrally located electric generator 54 is illustrated as being substantially disposed around the stator axle 106 (shown in a pair of vertical dotted lines) and situated within the horizontal wheel 36. The wheel 36 provides a means of attaching the wings 24 through the connection of the battens 40 to the outer surfaces of the turbine's bearings 104 and 108 via the rotor casing or generator 54 exterior. While this embodiment reduces the number of elements disclosed within the 1st embodiment of FIG. 1A, the apparatus geometry and airfoil characteristics are substantially the same. The central generator 54 is configured to make use of a plurality of rotating external magnets which serve as a rotor and internal induction coils serving as a stator. The external case of the generator 54 is fitted with cooling fins which function as heat sinks and radiators that are then air cooled as the turbine rotates. This design produces a significant energy savings as it reduces the temperature of the magnets which is known to be inversely proportional to the magnetic force of a magnet (as a magnet is heated, it loses magnetism). These rotating cooling fins allow the generator to cool itself and produce more energy over extended periods of time, which is not common in prior art. In addition, the generator 54 can be shaped as an oblate spheroid having an elliptical form (as is shown here) which allows the rotor magnets to have a substantially concave inner surface which then encompasses the generally convex stator induction coil surfaces. This arrangement serves to help focus or concentrate the magnetic lines of flux (or the flux density) of the concave rotor magnets on to the convex induction coils of the stator. The magnetic lines of flux are greatest at the poles of the magnet and so by using curved shaped magnets and positioning them in an arc towards the stator coils the effective flux density can be increased. This increases the amount of magnetic lines of flux which are available to be cut by the rotor motion and induced as electrical current flow into the output stator coils. The stator coils are built around the axle shaft 106 and have a top axle bearing 108 and a bottom axle bearing 104 about which the rotor case is attached and rotates. The generator 54 exterior casing is comprised of two half sections each containing magnets. The half sections join together at the dashed vertical line shown in the center of the casing. These casing halves are operatively attached to the two axle bearings so as to allow the magnets to rotate around the stator axle shaft 106. The top of the casing and axle shaft 106 are seated and capped by the top main bearing case lock nut 32. The bottom of the casing and axle shaft 106 are seated and operatively attached to the support shaft 22 through the bottom main bearing case locking nut 34 which also serves as a coupler element that allows the entire GRVAWT 20 to be disconnected from the support shaft 22 at that specific position. The support shaft 22 is intermediately supported through the support shaft deck locking nuts 61 on the support shaft deck 60. The support shaft deck 60 is supported by a plurality of support shaft deck vertical supports 62 which fasten to the base apparatus platform 66. The base of the support shaft 22 is terminated into the support shaft base support 58 which is then securely attached to the apparatus base platform 66.

In addition to the first and second embodiments of the present invention disclosed herein, it is to be understood that the GRVAWT is extremely versatile. As a result, various methods of extracting the kinetic energy of the turbine exist, such as simply terminating the turbine's rotor wings into a rotating shaft that is then directly attached to a generator rotor via bearings in a manner similar to a variety of other prior art VAWTs (direct drive).

In further objects and embodiments of the present invention, the usefulness of harnessing hydro kinetic energy is evident. When configured to operate as a water turbine the concept provides a needed new approach to impeller design and hydroelectric technology along with increased efficiency, resulting in more power and less water usage. In other applications, the rotor of the present invention is configured having a motor or other apparatus applying a turning force to the support section to produce fluid flow as in a pump. This drives the wings rotatably, which generates a flow of air or other fluids through the fluid medium in which the rotor is disposed.

In conclusion; it is also an object of the present invention to place the "center of gravity" and the "center of effort" and "the center of rotation" all in the same central position, producing a simple, low cost, light weight, robust, intuitively appealing and perfectly balanced turbine, whose individual elements are combined to provide maximum propulsion in a coherent synergy that does not exist in prior art. The golden spiral wing and the golden ellipse design maintains a low "incident angle" which causes a smooth and efficient transfer of wind force into kinetic energy at the rotor, which in turn results in a very low loading impact on the base supporting structure. As a result of the inherent proportional equilibrium of the golden ratio design, a GRVAWT which generates minimal energetic losses is realized in the present invention. GRVAWT prototype testing has demonstrated that the axis of rotation can be offset a full 360 degrees in the Elevation angle (rotating the axis end over end), furthermore, the Azimuth angle can be offset a full 360 degrees while the axis is positioned in a horizontal plane and the device will continue to rotate when in contact with a nominal constant air flow current. Consequently, the ability of the GRVAWT to harvest wind force from any direction as well as from above or below, establishes the present invention as being ideal for placement of the peak of a roof. The wind is deflected along the sloping roof on to the bottom of the turbine wings as well as striking the turbine directly. This makes the GRVAWT ideal for the urban and commercial environments. Finally, the GRVAWT can be configured to rotate (Clockwise) CW or (Counter Clockwise) CCW however, it is an intention of the GRVAWT design to utilize the Coriolis force (Refer: Coriolis as described in U.S. Pat. No. 6,465,899, Oct. 15, 2002 Roberts). This is done in order to achieve a low wind cut in speed and adhere to the law of conservation of angular momentum. Therefore, the GRVAWT is designed to rotate CCW in the northern hemisphere and CW in the southern hemisphere and to flip a coin on the Equator.

Although preferred embodiments of the present invention have been described in detail herein and illustrated within the drawings provided, it is to be understood that the present invention is not to be limited to only these precise embodiments and that various alterations and modifications may be effected therein without departure from the scope, concept or spirit of the present invention. Consequently, since certain changes may be made in the foregoing disclosure without departing from the scope of the invention herein involved, it is intended that all matter contained in the above description and depicted in the accompanying drawings be construed in an illustrative and not in a limiting sense. Therefore, it is to be understood that the present invention is more precisely defined and described by the following claims.

What is claimed is:

1. A fluid flow rotary driven apparatus comprising:
a rotor including a support section that has an axis of rotation extending therethrough and a plurality of elongate curved rotor wings attached to said support section and extending longitudinally outwardly in a spiral configuration from said support section, each said wing having inner and outer ends at respective longitudinal ends thereof and a pair of opposing longitudinal edges that interconnect said inner and outer ends, each said wing being attached to said support section at said inner end of said wing and projecting longitudinally outwardly to said outer end of said wing in a direction from said inner end to said outer end that is transverse to said axis of rotation, each said wing including a convexly curved outer surface defined by a plurality of logarithmic spiral line segments, at least one said logarithmic spiral line segment originating from a point on said axis of rotation and extending longitudinally across said wing to interconnect said inner and outer ends of said wing, each said logarithmic spiral line segment extending in its entirety within a single respective plane outwardly from said axis of rotation, said convexly curved surface further being defined by circularly curved arcs extending between and interconnecting said opposing longitudinal edges of said wing and intersecting said logarithmic spiral line segments, at least one said logarithmic spiral line segment in each said wing being longer than each said arc in said wing; said wings being responsive to a fluid flow across said outer surfaces of said wings for driving said support section to turn about said axis of rotation; said outer end of each said wing and an inner point on at least one said logarithmic spiral line segment being interconnected by a straight line that intersects said axis of rotation such that said outer end and said inner point are located on opposite sides of said axis of rotation and the fluid flow across said wings produces a leverage arm along said straight line that facilitates turning of said rotor and rotation of said wings; and a rotary transmission device operably interconnected to said support section and responsive to turning of said support section for producing a selected form of energy output.

2. The apparatus of claim 1 in which each logarithmic spiral line segment approximates a golden ratio spiral.

3. The apparatus of claim 2 in which each of said wing sections separately forms a semi-ellipse profile having a major axis which is perpendicular to said axis of rotation.

4. The apparatus of claim 2 in which each said wing further includes a three dimensional concavely curved inner surface which forms a partially closed area of space such that said wing has the general shape of a spiral crescent.

5. The apparatus of claim 4 in which one of said logarithmic spiral line segments of each wing extends for its entire length within a single plane perpendicular to said axis of rotation, each wing including symmetrical upper and lower sections intersected by said single perpendicular plane, said symmetrical upper and lower wing sections together forming an ellipse profile having a major axis that is perpendicular to said axis of rotation, each of said symmetrical upper and lower wing sections separately forming a semi-ellipse profile having a major axis that is perpendicular to said axis of rotation.

6. The apparatus of claim 1 in which one of said logarithmic spiral line segments of each wing extends for its entire length within a single plane perpendicular to said axis of rotation.

7. The apparatus of claim 6 in which each wing includes symmetrical upper and lower sections intersected by said single perpendicular plane.

8. The apparatus of claim 7 in which said symmetrical upper and lower wing sections together form an ellipse profile having a major axis which is perpendicular to said axis of rotation.

9. The apparatus of claim 1 in which said wings extend outwardly from said support section in a symmetrically overlapping pattern wherein said outer end of each said wing overlaps an adjacent wing.

10. The apparatus of claim 1 in which said support section includes a shaft, a main bearing case rotatably attached to said shaft and a wing supporting wheel attached to and encircling said main bearing case.

11. The apparatus of claim 10 in which each said wing is attached to said wheel by a batten that includes a first curved segment secured and generally conforming to said wheel and a second curved segment connected to said first curved segment and conforming to the curved surface of a respective said wing.

12. The apparatus of claim 10 in which said rotary transmission device includes an output gear that is mounted for rotating axially about said shaft and a plurality of diagonal struts that interconnect said wheel and said output gear, said struts maintaining an hourglass-shaped configuration comprising a pair of golden triangles, said output gear being operatively engaged with at least one generator for generating electrical power in response to turning of said rotor and resulting rotation of said output gear.

13. The apparatus of claim 1 in which the distance between said inner and outer ends of each said wing is greater than the distance between said axis of rotation and said outer end of said wing.

14. The apparatus of claim 1 in which said logarithmic spiral line segments defining said wing converge to intersect each other at two points located respectively at said inner and outer ends of said wing to define a substantially crescent oval shaped wing such that said fluid flow produces a leverage arm and an increased torque on said apparatus.

15. The apparatus of claim 1 in which each said wing further includes a concavely curved inner surface which partially closes an area of space.

16. A fluid flow rotary apparatus comprising:
a rotor including a support section that has an axis of rotation and a plurality of curved rotor wings, each said rotor wing attached to and extending outwardly in a spiral curve from a central point of origin on said axis of rotation, each said wing having inner and outer ends and extending outwardly in a transverse direction from said support section, wherein the distance between said axis of rotation and said outer ends of said wings defines a radius of said rotor, each said wing being defined by horizontal logarithmic spiral line segments extending longitudinally from said axis of rotation, which spiral line segments are vertically intersected by circular arcs to form a three dimensional convex curved outer surface and a concave inner surface, which partially encloses an area of space;
at least one said logarithmic spiral line segment in each said wing being longer than each said circular arc in said wing, at least one said logarithmic spiral line segment extending for its entire length from said axis of rotation to said outer end of said wing in a single continuous longitudinal plane, at least one said logarithmic spiral line segment including at least one inner point on said spiral curve which is located on an opposite side of said axis of rotation from said outer end of said wing along a line intersecting said axis of rotation;
the distance between each said at least one inner point on said spiral curve and said outer end of said wing being greater than the radius of said apparatus to produce a leverage arm that facilitates the rotation of said rotor wings about said axis of rotation; and
a rotary transmission section which converts the rotational force from a fluid flow across said rotor wings to produce an energy output or alternatively produces a fluid flow output from said rotor wings in response to an applied rotational force.

17. The apparatus of claim 16 in which at least one said logarithmic spiral line segment includes a spiral growth rate which approximates that of a golden ratio spiral.

18. A fluid flow rotary driven apparatus comprising:
a support section having an axis of rotation extending therethrough; and
a plurality of curved wings attached to and extending longitudinally outwardly in a spiral configuration from said support section, each wing having inner and outer ends and a pair of opposing longitudinal edges extending between said inner and outer ends, each said wing being attached to said support section at said inner end of said wing and projecting longitudinally outwardly to said outer end of said wing in a direction that is transverse to said axis of rotation, each said wing including a convexly curved outer surface defined in part by horizontal logarithmic spiral line segments originating from said axis of rotation and extending longitudinally outwardly across said wing to interconnect said inner and outer ends of said wing, each said logarithmic spiral line segment extending in its entirety within a single respective plane that extends outwardly from said axis of rotation, said convexly curved outer surface being further defined by circular arcs extending between and interconnecting said opposing longitudinal edges of said wing and vertically intersecting said logarithmic spiral line segments;
said apparatus being operated in at least one of a first manner wherein said wings are responsive to a fluid flow across said wings for turning said support section about said axis of rotation and a second manner wherein said support section is responsive to an applied rotation force for turning said wings to generate a fluid flow, said outer end of each said wing and an inner point on said logarithmic spiral line segment partly defining said wing being interconnected by a straight line that intersects said axis of rotation such that said outer end and said inner point are located on opposite sides of said axis of rotation on said straight line to produce a leverage arm that facilitates turning of said support section and said wings.

19. The apparatus of claim 18 in which said logarithmic spiral line segment approximates a golden ratio spiral and in which said circular arcs form a three dimensional concavely curved inner surface which forms a partially closed area of space such that said wing has the general shape of a spiral crescent.

20. The apparatus of claim 18 in which said logarithmic spiral line segment extends in a single plane that is perpendicular to said axis of rotation.

* * * * *